US012071316B2

(12) United States Patent
Shiraishi

(10) Patent No.: US 12,071,316 B2
(45) Date of Patent: Aug. 27, 2024

(54) PAPER FEED DEVICE AND IMAGE FORMING APPARATUS

(71) Applicant: SHARP KABUSHIKI KAISHA, Osaka (JP)

(72) Inventor: Yoshinori Shiraishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 137 days.

(21) Appl. No.: 17/675,835

(22) Filed: Feb. 18, 2022

(65) Prior Publication Data

US 2022/0269215 A1 Aug. 25, 2022

(30) Foreign Application Priority Data

Feb. 22, 2021 (JP) ................................ 2021-026496

(51) Int. Cl.

*B65H 1/26* (2006.01)
*B65H 1/04* (2006.01)
*G03G 15/00* (2006.01)

(52) U.S. Cl.

CPC ............... *B65H 1/266* (2013.01); *B65H 1/04* (2013.01); *G03G 15/6502* (2013.01); *B65H 2405/121* (2013.01); *G03G 2215/00713* (2013.01)

(58) Field of Classification Search

CPC ... B65H 1/00; B65H 1/04; B65H 1/26; B65H 1/266; B65H 2402/60; B65H 2403/513; B65H 2405/12; B65H 2405/121; G03G 15/6502

See application file for complete search history.

(56) References Cited

U.S. PATENT DOCUMENTS

| | | | | |
|---|---|---|---|---|
| 5,901,905 | A | 5/1999 | Jung | |
| 2008/0117482 | A1* | 5/2008 | Kusumi | H04N 1/00525 358/498 |
| 2014/0042687 | A1* | 2/2014 | Taoka | B65H 1/00 271/9.01 |
| 2015/0185685 | A1 | 7/2015 | Takemoto et al. | |
| 2017/0308029 | A1* | 10/2017 | Soda | G03G 21/1647 |
| 2018/0186584 | A1* | 7/2018 | Chiu | B41J 13/10 |
| 2021/0070571 | A1* | 3/2021 | Oshida | B65H 1/04 |

FOREIGN PATENT DOCUMENTS

| | | | |
|---|---|---|---|
| JP | H10-281504 | A | 10/1998 |
| JP | 2008-254841 | A | 10/2008 |
| JP | 2015-209311 | A | 11/2015 |

* cited by examiner

*Primary Examiner* — Prasad V Gokhale
(74) *Attorney, Agent, or Firm* — ScienBiziP, P.C.

(57) ABSTRACT

An according to an aspect, a paper feed device includes a device body and a paper feed cassette inserted into the device body along an insertion direction. The paper feed device includes a lock lever mounted to the paper feed cassette via a lever shaft; a spring that applies a rotational force which rotates the lock lever in an engagement direction; and a lock member provided at the device body.

3 Claims, 10 Drawing Sheets

PAPER FEED DEVICE AND IMAGE FORMING APPARATUS

CROSS-REFERENCE TO RELATED APPLICATION

The present application claims priority from Japanese Application JP 2021-026496, the content to which is hereby incorporated by reference into this application.

BACKGROUND OF THE INVENTION

1. Field of the Invention

The present invention relates to a paper feed device that supplies paper, and an image forming apparatus provided therewith.

2. Description of the Related Art

In an image forming apparatus, a paper feed portion (paper feed device) capable of storing a plurality of sheets of paper is provided thereby to reduce the number of times for replenishing the sheets of paper and thereby to reduce the user's time and effort. Some paper feed portions are detachably mounted to a device body in order to improve workability when replenishing the sheets of paper. By the way, when there is a large amount of sheets of paper stored in the paper feed portion, the weight becomes large, which may cause a large burden on the user. Therefore, it has been proposed to provide a pulling mechanism for pulling the paper feed portion into the device body (for example, Japanese Unexamined Patent Application Laid-Open No. H2-198925, Japanese Unexamined Patent Application Laid-Open No. 2008-254841, and Japanese Unexamined Patent Application Laid-Open No. 2015-209311).

SUMMARY OF THE INVENTION

A sheet storage container conveying device described in Japanese Unexamined Patent Application Laid-Open No. H2-198925 includes a storage container that stores a plurality of sheets, a conveyer that conveys the sheet storage container, and a driver that drives the conveyer.

In the sheet storage container conveying device described above, a motor is used as the driver to drive the conveyer, and electric power must be supplied to the motor, thus complicating the device.

An image forming apparatus described in the Japanese Unexamined Patent Application Laid-Open No. 2008-254841 has a paper feed cassette that is detachably mounted to a storage of the device body, an engagement area provided at the paper feed cassette, and a pull-in area provided at the storage and provided with an engagement groove. The pull-in member moves while engaging the engagement area in the engagement groove, thereby to pull in the paper feed cassette.

In the above image forming apparatus, when the pull-in member is in a pull-in position, it is merely that an engagement guide portion so guides as to engage the engagement area in the engagement groove, and the pull-in member does not contribute to the operation of pulling in the paper feed cassette, failing to reduce the burden on the user.

A unit pull-in device described in the Japanese Unexamined Patent Application Laid-Open No. 2015-209311 includes a hook member that engages with an engaged portion provided at the unit, a pull-in force generating mechanism that acts a pull-in force on the hook member, and a suppressing member that, at the time of pulling the unit into the device body, causes a load corresponding to the pull-in speed thereby to suppress an increase in the pull-in speed.

In the above unit pull-in device, the unit is pulled in by a plurality of members, such as a first turning member provided at the pull-in force generating mechanism and a two-stage gear disposed between the pull-in force generating mechanism and the suppressing member, thus complicating the device.

An aspect of the present invention has been made for solving the above problem, and it is an object of the aspect of the present invention to provide a paper feed device and an image forming apparatus that can assist in pulling in a paper feed cassette.

A paper feed device according to an aspect of the present invention includes a device body and a paper feed cassette inserted into the device body along an insertion direction, the paper feed device includes: a lock lever mounted to the paper feed cassette via a lever shaft; a spring that applies a rotational force which rotates the lock lever in an engagement direction; and a lock member provided at the device body, wherein the lock lever has a lever claw provided at a tip end extending from the lever shaft toward a downstream side in the insertion direction, the lock member has an engagement area with which the lever claw is engaged and a pull-in area provided at an upstream side of the engagement area in the insertion direction, the pull-in area, as toward the engagement area, is inclined so as to descend downstream in the engagement direction, and when the paper feed cassette is to be inserted into the device body, the lever claw presses the pull-in area.

The paper feed device according to an aspect of the present invention, includes: a handle provided at the paper feed cassette and gripped by a user when pulling out the paper feed cassette, and a transmission mechanism that transmits, to the lever shaft, a force of pulling out the paper feed cassette by the user gripping the handle, wherein the lock lever may be configured to be rotated in a direction opposite to the engagement direction by the force transmitted from the transmission mechanism.

In the paper feed device according to an aspect of the present invention, the lock member may be configured to have a push-up area provided at an upstream side of the pull-in area in the insertion direction, and the push-up area may be configured to, as toward the pull-in area, be inclined so as to rise.

An image forming apparatus according to an aspect of the present invention includes the paper feed device according to according to the present invention.

According to the aspect of the present invention, a simple mechanism can assist the force to pull in the paper feed cassette, making it possible to ensure the engagement of the lock member with the lock lever. That is, when the lever claw is in contact with the pull-in area, the rotational force from the spring generates a divided force by the inclination of the pull-in area, and then the divided force acts as a force to pull in the paper feed cassette toward the device body side.

DETAILED DESCRIPTION OF THE INVENTION

First Embodiment

An image forming apparatus according to a first embodiment of the present invention will be described below with reference to the drawings.

Figure 1:
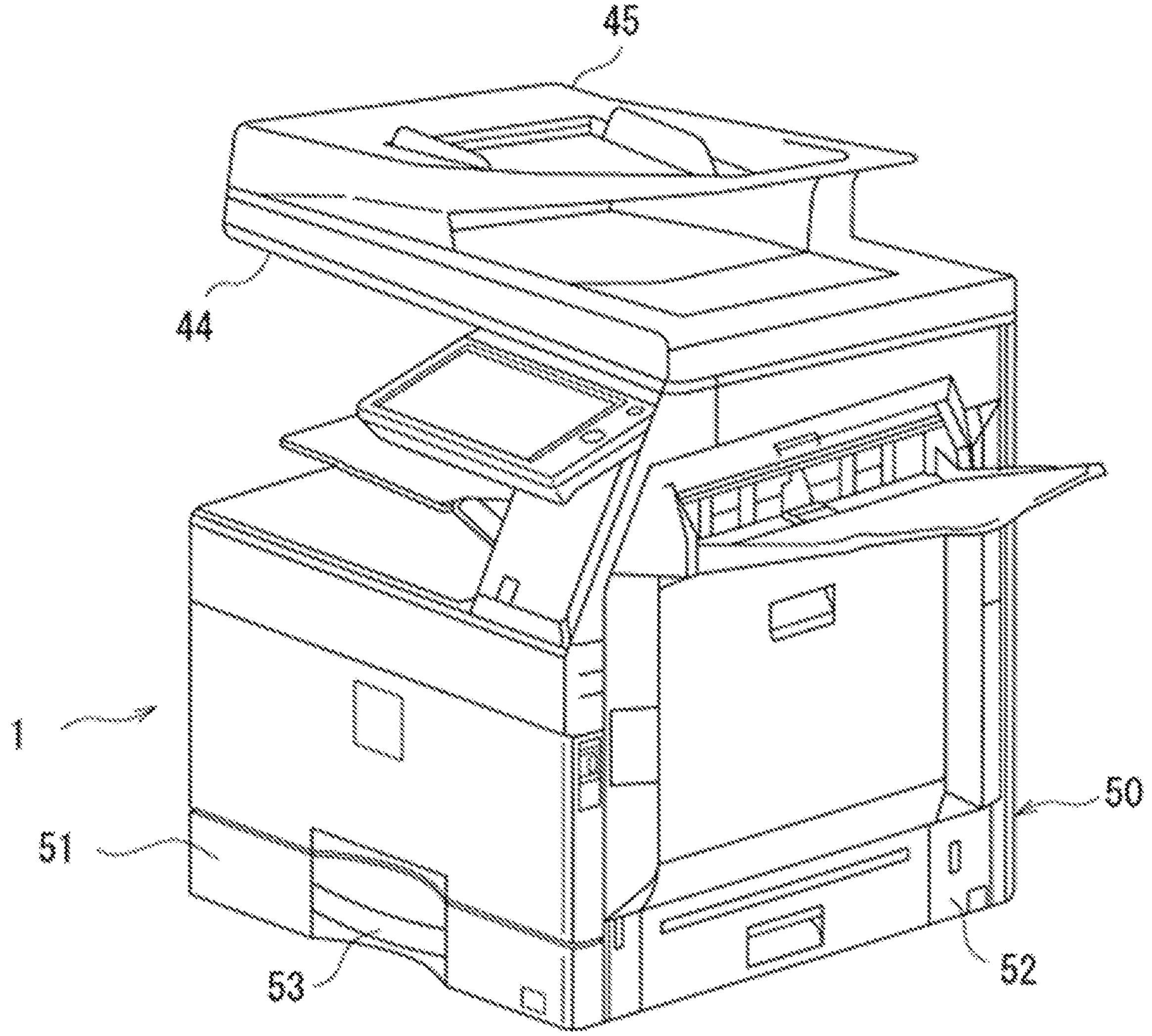
FIG. 1 is an external perspective view of an image forming apparatus according to a first embodiment of the present invention.
Figure 2:
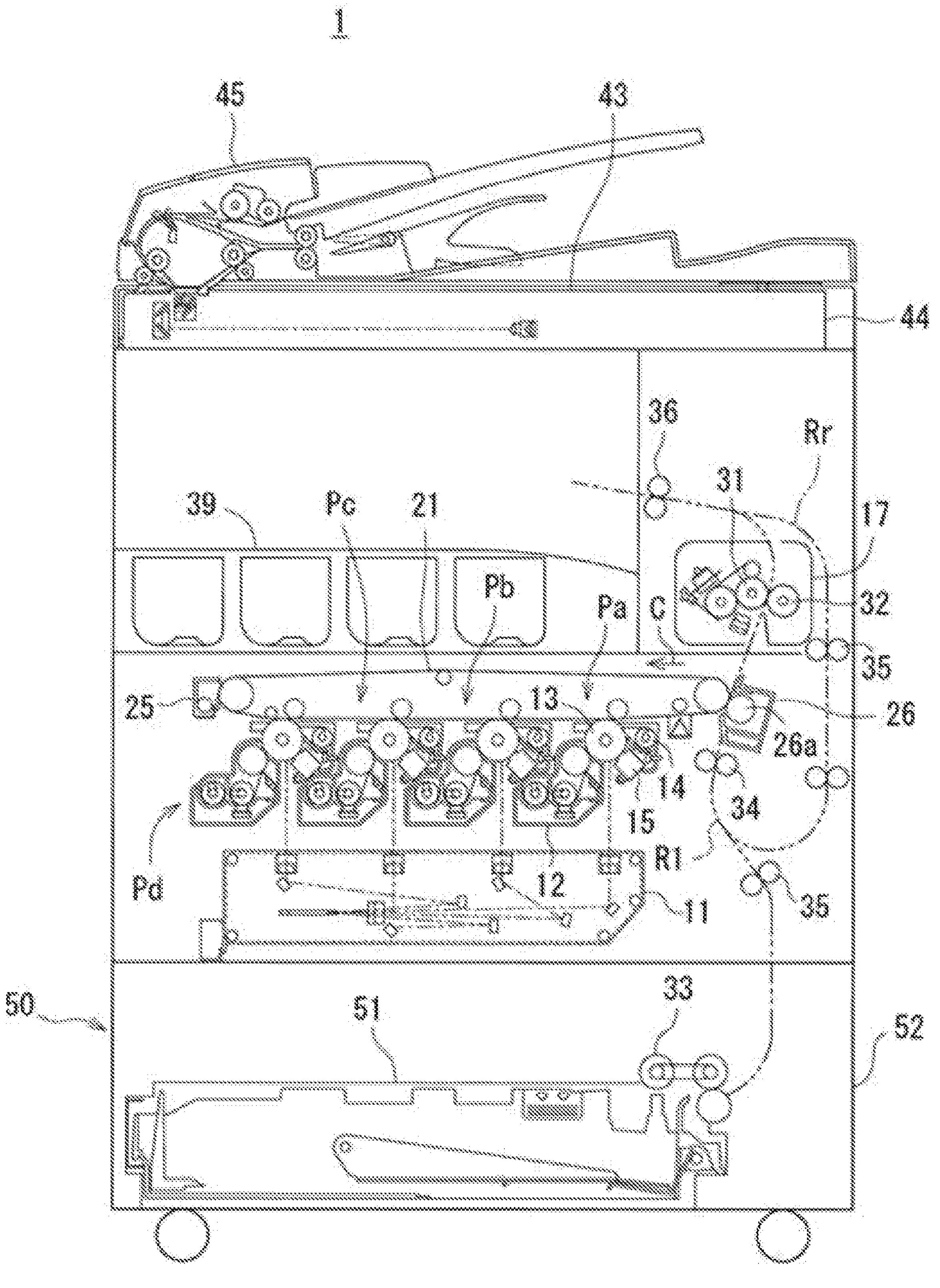
FIG. 2 is a schematic side view of the image forming apparatus according to the first embodiment of the present invention.

FIG. 1 is an external perspective view of the image forming apparatus according to a first embodiment of the present invention, and FIG. 2 is a schematic side view of the image forming apparatus according to the first embodiment of the present invention.

An image forming apparatus 1 according to the first embodiment of the present invention has a main body portion that performs image formation, a document reader 44 and a document conveyer 45, and a paper feed device 50 that is provided in the lower portion. The paper feed device 50 includes a device body 52, and a paper feed cassette 51 that is inserted into the device body 52. The front face of the paper feed cassette 51 is provided with a handle 53 that is gripped by a user when pulling out the paper feed cassette 51. Any detailed configuration of the paper feed device 50 will be described with reference to FIG. 3 below.

The document reader 44 has an upper face on which a document placing table 43 on which a document is placed, reads an image of the document on the document placing table 43, and creates image data and transmits the image data to the image forming apparatus 1. The document conveyer 45 automatically conveys the document onto the document placing table 43. The document conveyer 45 is mounted to the image forming apparatus 1 in a rotatable manner, and is rotated thereby to open the top of the document placing table 43, making it possible to manually place the document.

The device body of the image forming apparatus 1 includes an exposing device 11, a developing device 12, a photoreceptor drum 13, a cleaning device 14, a charger 15, an intermediate transfer belt 21, a fixing device 17, a paper receiving tray 39, and a paper conveying path R1, and, depending on the image data transmitted from outside or from the document reader 44, forms multicolor and monochromatic images on a predetermined sheet of paper.

The image data handled by the image forming apparatus 1 is for color images using respective black (K), cyan (C), magenta (M), and yellow (Y) colors. Therefore, the developing device 12, the photoreceptor drum 13, the charger 15, the cleaning device 14 are so provided as to form four types of latent images for respective colors, and are set to black, cyan, magenta, and yellow, respectively; and these configure four image stations Pa, Pb, Pc, and Pd.

The photoreceptor drum 13 is disposed in substantially the center of the image forming apparatus 1. The charger 15 uniformly charges the surface (circumferential face) of the photoreceptor drum 13 to a predetermined potential. The exposing device 11 exposes the surface of the photoreceptor drum 13 thereby to form an electrostatic latent image. The developing device 12 develops the electrostatic latent image on the surface of the photoreceptor drum 13 thereby to form a toner image on the surface of the photoreceptor drum 13. Through a series of operations described above, the toner image of each color is formed on the surface of one of the respective photoreceptor drums 13. After the developing and the image transferring, the cleaning device 14 removes and collects any residual toner from on the surface of the photoreceptor drum 13.

The intermediate transfer belt 21 circumferentially moves in the direction of an arrow mark C, the intermediate transfer belt cleaner 25 removes and collects any residual toner, the toner images of respective colors formed on the surface of the respective photoreceptor drums are transferred in sequence and superimposed thereby to form a color toner image on the surface of the intermediate transfer belt 21.

The image forming apparatus 1 is further provided with a secondary transfer device 26 including a transfer roller 26*a*. The transfer roller 26*a* has a nip area formed between transfer roller 26*a* and the intermediate transfer belt 21, and conveys the sheet of paper, which has been conveyed through the paper conveying path R1, in a manner to be sandwiched in the nip area. When the sheet of paper passes through the nip area, the toner image on the surface of the intermediate transfer belt 21 is transferred.

The image forming apparatus 1 performs the image formation using the sheet of paper accumulated in the paper feed cassette 51. The paper feed device 50 is disposed below the exposing device 11. Further, the paper receiving tray 39 is disposed below the document reader 44, and is used to place the imaged paper.

The sheet of paper is pulled out of the paper feed cassette 51 by a pickup roller 33 and fed to the S-shaped paper conveying path R1. Along the paper conveying path R1, a conveying roller 35, a paper stop roller 34, a secondary transfer device 26, the fixing device 17, and a paper ejecting roller 36 are further disposed.

The paper stop roller 34 temporarily holds the sheet of paper being conveyed from the paper feed cassette 51 and conveys the sheet of paper to the transfer roller 26*a* at a timing that aligns the tip end of the toner image on the photoreceptor drum 13 with the tip end of the sheet of paper. The conveying roller 35 is a small roller to assist in promoting the conveying of the sheet of paper.

The fixing device 17 receives the sheet of paper with an unfixed toner image formed thereon, and sandwiches the sheet of paper between a heating roller 31 and a pressurizing roller 32, thereby to fix the toner image on the sheet of paper. The sheet of paper after the fixing is ejected onto the paper receiving tray 39 by the paper ejecting roller 36.

When the image formation is to be performed on the back face as well as the surface of the sheet of paper, the sheet of paper is conveyed in a reverse direction from the paper ejecting roller 36 to a reverse path Rr, the front and back faces of the sheet of paper are reversed, the sheet of paper is led to the paper stop roller 34, the image formation is performed on the back face in the same way as on the surface, and the sheet of paper is conveyed out to the paper receiving tray 39.

Figure 3:
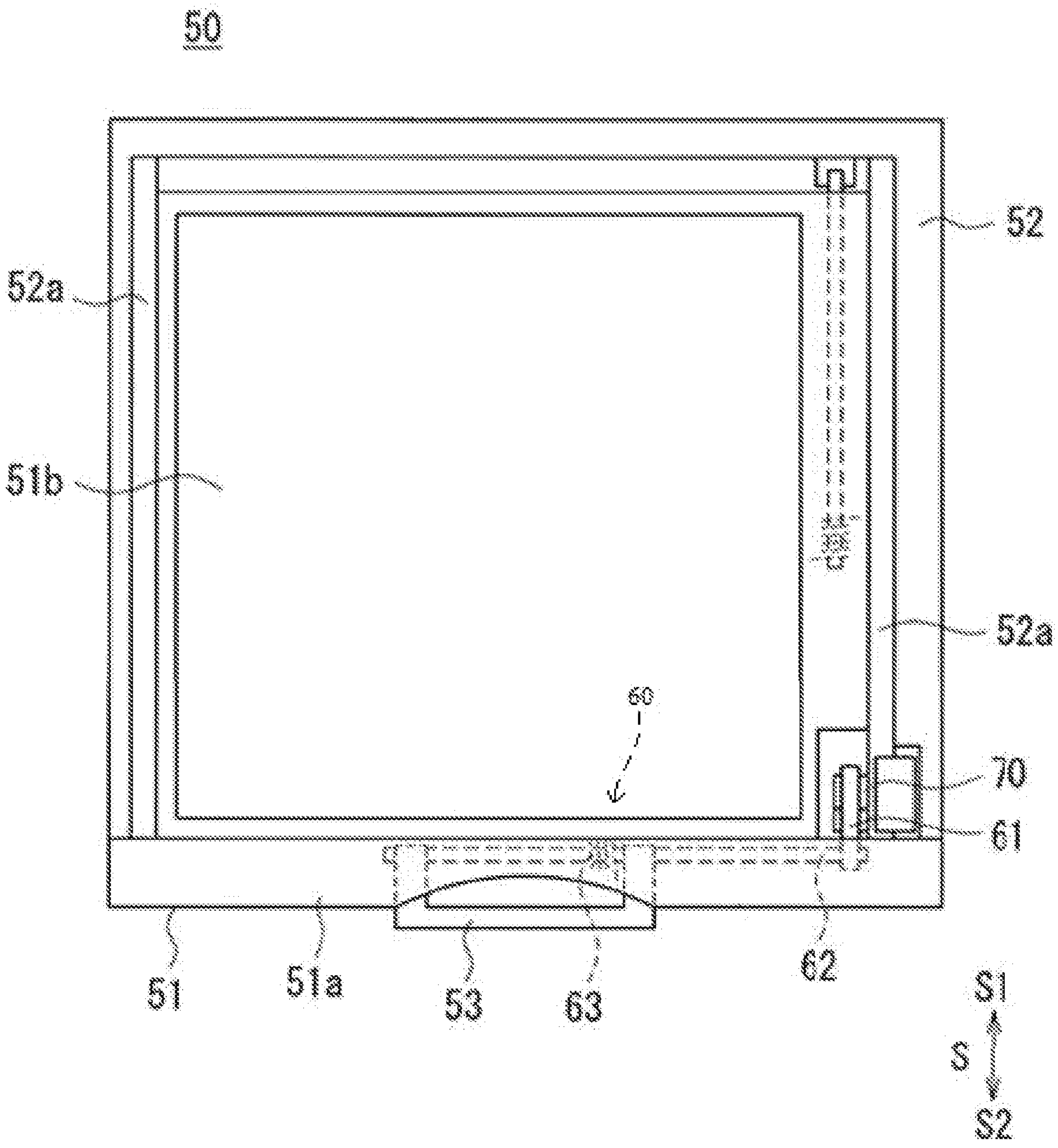
FIG. 3 is a schematic top view of a paper feed device for the first embodiment of the present invention.
Figure 4:
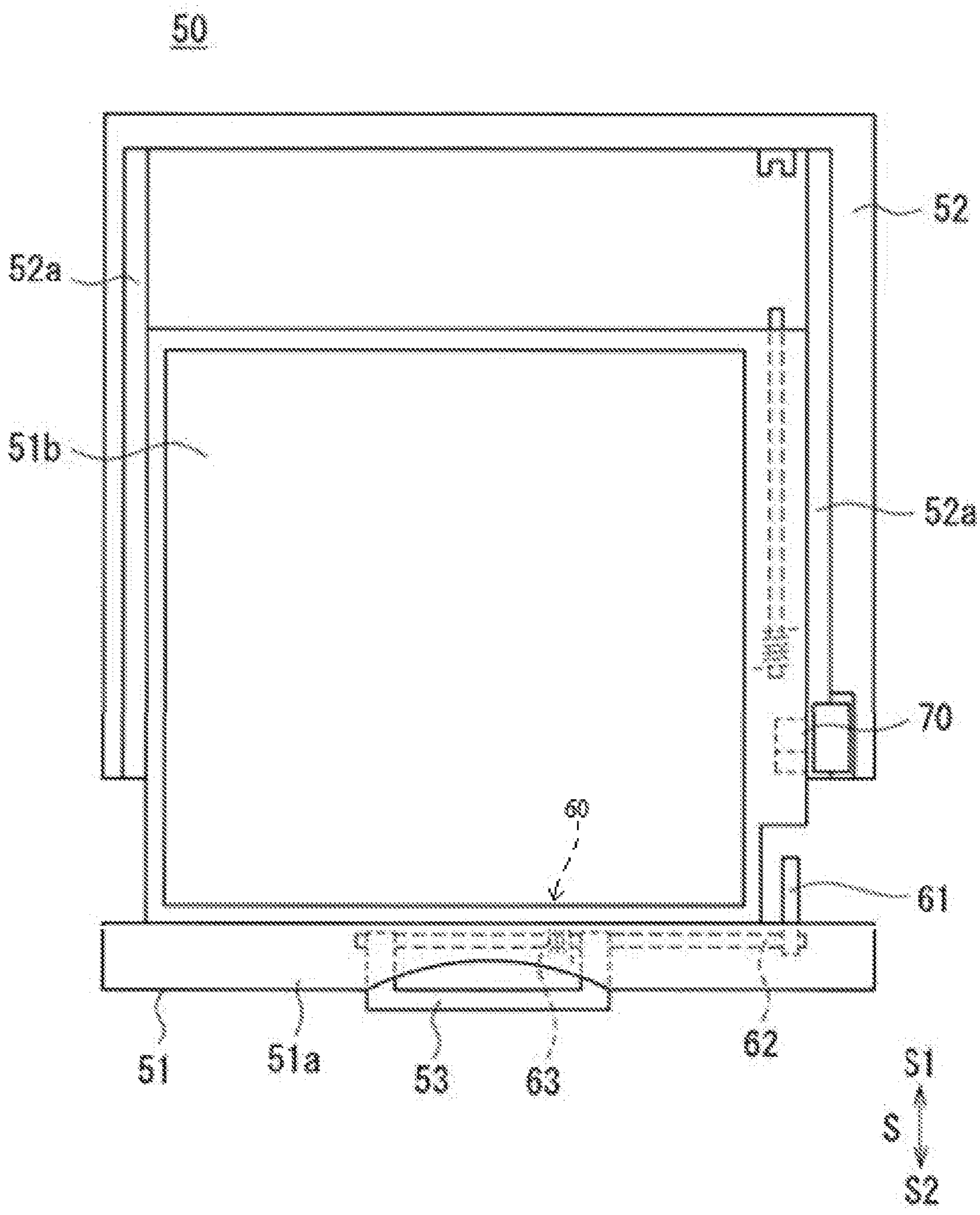
FIG. 4 is a schematic top view of the paper feed device shown in FIG. 3 with the paper feed cassette pulled out.

FIG. 3 is a schematic top view of the paper feed device, and FIG. 4 is a schematic top view of the paper feed device shown in FIG. 3 with the paper feed cassette pulled out.

The paper feed device 50 is so configured that the paper feed cassette 51 is stored in the device body 52. The paper feed cassette 51 is inserted from an opening in the front face of the device body 52 toward the back. For the purpose of description, a direction in which the paper feed cassette 51 is inserted into the device body 52 (upward in FIG. 3) may be referred to as an insertion direction S1, a direction in which the paper feed cassette 51 is pulled out of the device body 52 (downward in FIG. 3) may be referred to as a pull-out direction S2, and the insertion direction S1 and the pull-out direction S2 in combination may be referred to as an in-out direction S.

The paper feed cassette 51 has a front face panel 51*a* that covers the front face of the device body 52 and a cassette body 51*b* that is stored inside the device body 52. The cassette body 51*b* is a container with a large central portion that is concave, and is surrounded by a portion higher than the central portion. In the cassette body 51*b*, the sheets of paper are loaded on the flat central portion. In FIG. 3, the cassette body 51*b* is schematically shown, but is not limited to this, and the central portion may be provided with a regulation portion for aligning end portions of the sheets of paper and a guide plate for lifting one end of the sheet of paper.

The paper feed cassette 51 and the device body 52 are connected via a guide rail 52*a*. The guide rail 52*a* is provided between an inner face of the device body 52 extending along the in-out direction S and a side portion of the cassette body 51*b*. In the state where the paper feed cassette 51 is stored in the device body 52, the side portion of the cassette body 51*b* is engaged by the guide rail 52*a*. Not limited to this, it is sufficient that the guide rail 52*a* is provided in a portion where the device body 52 and the cassette body 51*b* face each other, for example, the guide rail 52*a* may be provided between a back face of the cassette body 51*b* and a bottom face of the device body 52. Further, it may be so configured that the device body 52 is provided with a frame or the like that supports the guide rail 52*a*, and the guide rail 52*a* is spaced away from the inner face of the device body 52. Moving the paper feed cassette 51 in the in-out direction S with the paper feed cassette 51 being guided by the guide rail 52*a* can insert the paper feed cassette 51 into the device body 52 or can pull the paper feed cassette 51 out of the device body 52.

It is so configured that a lock lever 61 is mounted to the paper feed cassette 51 via a lever shaft 62, a lock member 70 is provided in the device body 52, and in the state where the paper feed cassette 51 is stored in the device body 52, the lock lever 61 is engaged with the lock member 70. The paper feed cassette 51 is provided with a transmission mechanism 60 that transmits, to the lever shaft 62, a force to pull out the paper feed cassette 51 itself. For pulling the paper feed cassette 51 out of the device body 52, the lock lever 61 is rotated via the transmission mechanism 60, thereby making it possible to release the lock lever 61's engagement with the lock member 70. Any detailed configurations of the lock lever 61, the lock member 70, and the transmission mechanism 60 are to be described with reference to FIG. 5 below.

Figure 5:
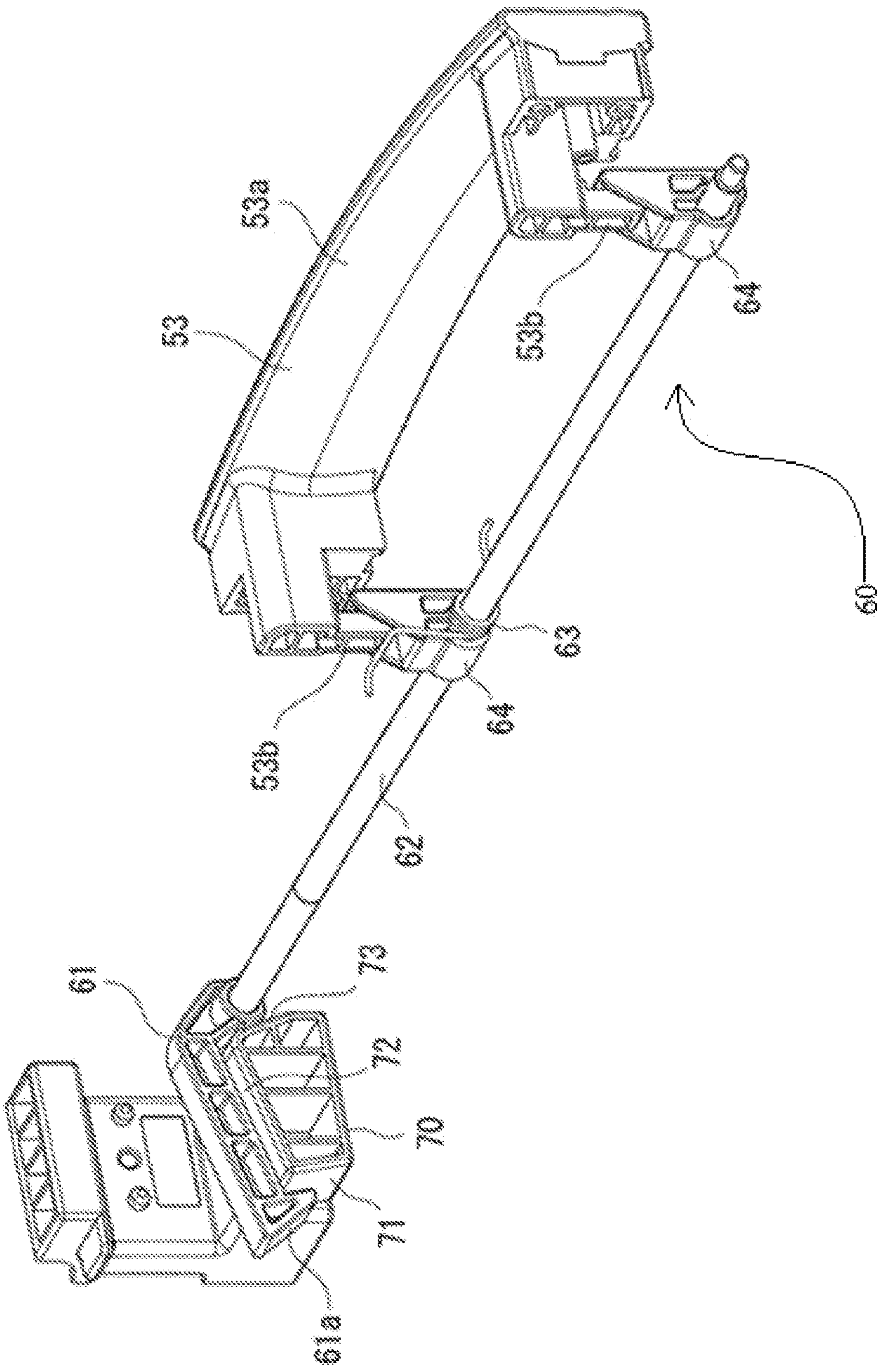
FIG. 5 is an essential perspective view of the paper feed device with part of its members extracted.

FIG. 5 is an essential perspective view of the paper feed device with part of its member extracted.

In FIG. 5, the handle 53, the lock lever 61, the lock member 70, and the transmission mechanism 60 of the paper feed device 50 are extracted to be shown, and members such as the front face panel 51*a*, the cassette body 51*b*, the device body 52, and guide rail 52*a* are removed.

The handle 53 has a grip portion 53*a*, which is gripped by the user, on the outside of the front face panel 51*a*, and an extended portion 53*b* extended from the grip portion 53*a* is inserted into a hole defined in the front face panel 51*a*. The handle 53 is not fixed to the front face panel 51*a*, and is so held as to slightly swing back and forth with respect to the front face panel 51*a*. The lever shaft 62 is mounted on the inside of the front face panel 51*a*, and is provided with a connection portion 64 at a portion that corresponds to the extended portion 53*b*. The extended portion 53*b* is hooked to the connection portion 64, and pulling and swinging the handle 53 rotates the lever shaft 62. The lock lever 61 is mounted to the lever shaft 62, and rotates with the lever shaft 62 as a fulcrum. The lock lever 61 is provided with a lever claw 61*a* at the tip end extending from the lever shaft 62 toward the downstream side in the insertion direction S1. A spring 63 that gives a rotational force is mounted to the lever shaft 62. The relation between the direction, in which the lock lever 61 is rotated by the spring 63, and the lock member 70 is to be described in combination with FIGS. 6 through 8 below.

The lock member 70 is provided in a position to contact the lock lever 61 when the paper feed cassette 51 is to be stored in the device body 52, and FIG. 5 shows a state where the lock lever 61 is engaged with the lock member 70. In the present embodiment, the lock member 70 is disposed below the lock lever 61; when the paper feed cassette 51 is to be stored in the device body 52, the lever claw 61*a* protruding downward from the tip end of the lock member 70 moves in a manner to trace the upper face of the lock member 70. The lock member 70 is provided with a push-up area 73, a pull-in area 72, and an engagement area 71 in the order from the upstream side to the downstream side in the insertion direction S1. That is, when the paper feed cassette 51 is to be stored in the device body 52, the lever claw 61*a* contacts the lock member 70 in the order of the push-up area 73, the pull-in area 72, and the engagement area 71.

The push-up area 73 is provided on an upper portion of the lock member 70's side face (side face on the pull-out direction S2 side) that opposes in the in-out direction S, and an apex of the push-up area 73 is an inclined face inclined toward the pull-in area 72 side. The pull-in area 72 is provided on the upper face of the lock member 70, and has an inclined face that is inclined downward toward downstream in the insertion direction S1. The engagement area 71 is provided on the upper portion of the lock member 70's side face that opposes in the in-out direction S (side face on the insertion direction S1 side), and is made into an inclined face so inclined that the upper end protrudes in the insertion direction S1 more than the lower end. Hooking the lever claw 61*a* with the engagement area 71 engages the lock lever 61 with the lock member 70.

In the lock member 70, essential portions including the push-up area 73, the pull-in area 72, and the engagement area 71, and any portion fixed to the guide rail 52*a* with screws or the like are integrally formed; not limited to this, however, it is sufficient that the lock member 70 is fixed to the device body 52 in a manner not to interfere with the engagement of the lock lever 61.

Figure 6:
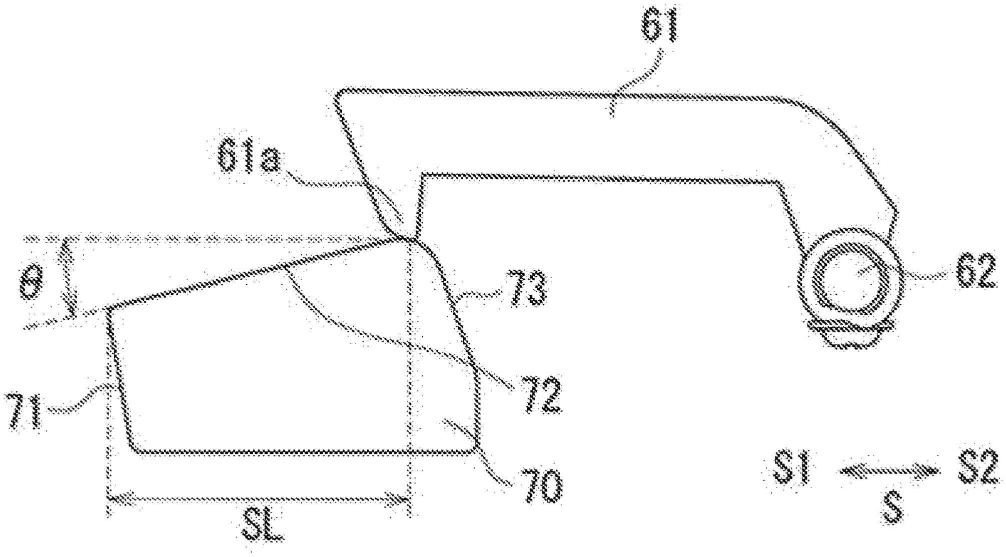
FIG. 6 is a schematic side view showing the positional relation between a lock lever and a lock member (No. 1).
Figure 7:
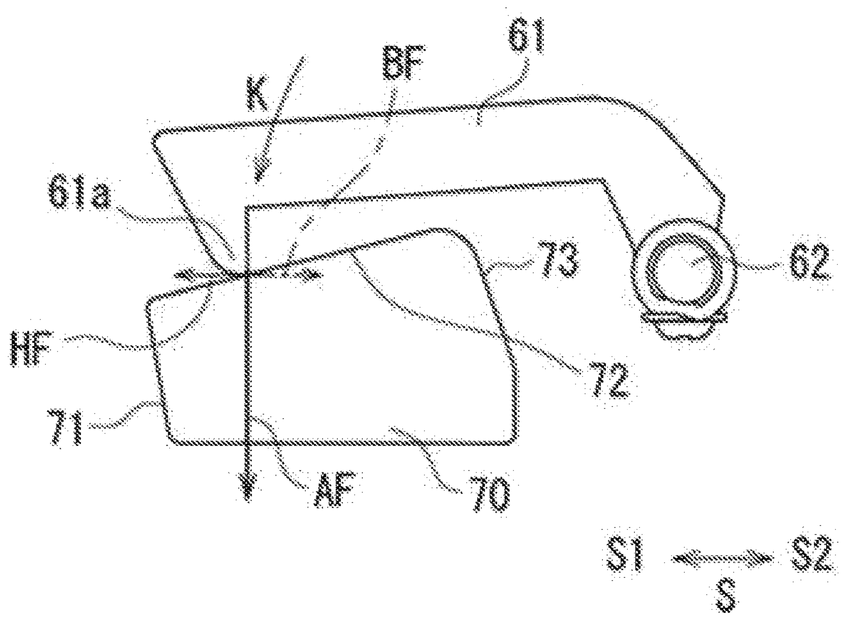
FIG. 7 is a schematic side view showing the positional relation between the lock lever and the lock member (No. 2).
Figure 8:
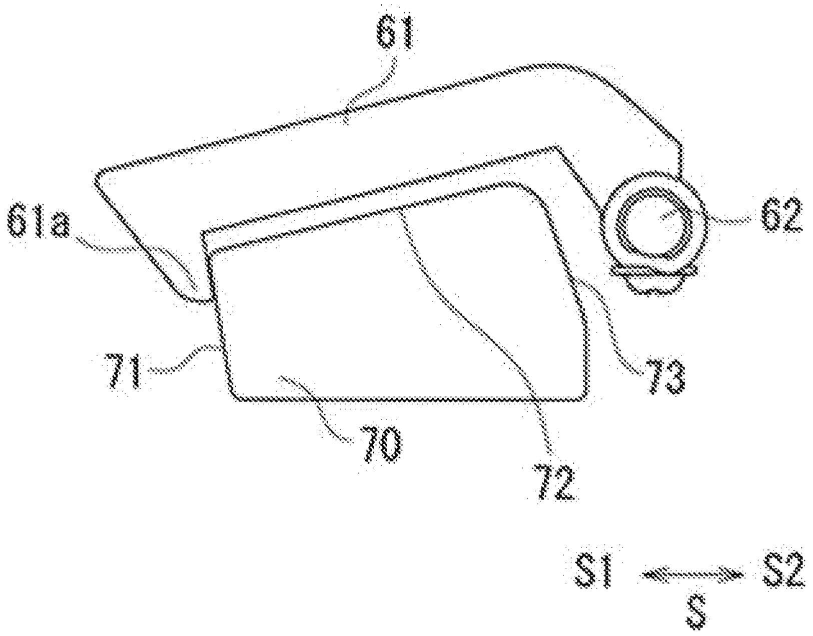
FIG. 8 is a schematic side view showing the positional relation between the lock lever and the lock member (No. 3).

Next, the positional relation between the lock lever 61 and the lock member 70 when the paper feed cassette 51 is to be stored in the device body 52 is described with reference to FIGS. 6 to 8. For ease of viewing the drawings, FIGS. 6 to 8 schematically show the lock member 70's essential portions including the push-up area 73, the pull-in area 72, and the engagement area 71, and omit any other portion. Further, for the lever shaft 62 as well, only the lock lever 61 is shown among the installed members, and any other member is omitted.

FIG. 6 is a schematic side view showing the positional relation between the lock lever and the lock member (part 1).

FIG. 6 shows that the tip end of the lever claw 61*a* is in contact with a boundary between the push-up area 73 and the pull-in area 72, that is, an apex of the pull-in area 72, of the lock member 70. According to the present embodiment, the pull-in area 72 has an inclination angle θ of about 13 degrees relative to the in-out direction S. Further, a length of the pull-in area 72 in the in-out direction S (stroke length SL) is about 31 mm.

By the spring 63 mounted to the lever shaft 62, the lock lever 61 is given a rotational force in a direction of lowering the lever claw 61*a* (counterclockwise in FIG. 6). As for the lever shaft 62, the rotational range is regulated by the front face panel 51*a* or the like that axially supports the lever shaft 62 itself, and, as shown in FIG. 5, the lever shaft 62 stops rotating when the lever claw 61*a* drops to a level where the lever claw 61*a* engages the engagement area 71. Further, the lock lever 61 is so configured that, when the handle 53 is pulled, the lock lever 61 rotates in a direction opposite to the rotation by the spring 63 (clockwise in FIG. 6), and the lever claws 61*a* rises upward.

When the paper feed cassette 51 is to be stored in the device body 52, the rotational force from the spring 63 lowers the lever claws 61*a*, and the lever claw 61*a* contacts the push-up area 73. When the paper feed cassette 51 is moved further in the insertion direction S1, the lever claw 61*a* is pushed upward by the push-up area 73, and the lock lever 61 so rotates as to contact the apex of the pull-in area 72. In this way, when the paper feed cassette 51 is to be inserted, the lock lever 61 is pushed up and out of the way according to the inclination of the push-up area 73, thus preventing the lock lever 61 from obstructing the insertion of the paper feed cassette 51.

FIG. 7 is a schematic side view showing the positional relation between the lock lever and the lock member (part 2).

FIG. 7 shows a state in which the lock lever 61 has moved in the insertion direction S1 from the state shown in FIG. 6, and the tip end of the lever claw 61*a* is in contact with the pull-in area 72 of the lock member 70. As described above, when the paper feed cassette 51 is pushed into the device body 52 by the user, the lever claw 61*a* moves in a manner to trace the upper face of the lock member 70. As shown in FIG. 7, when the tip end of the lever claw 61*a* is in contact with the pull-in area 72, the rotation in an engagement direction K is stopped by the pull-in area 72. Here, the engagement direction K is defined as a direction along the trajectory traced by the tip end of the lever claw 61*a* when the lock lever 61 is rotated by the rotational force from the spring 63, and the engagement direction K overlaps with a circle around the lever shaft 62.

In the state shown in FIG. 7, the lever claw 61*a*'s pressing force AF for pressing the pull-in area 72 that has stopped the rotation is generated between the lock lever 61 and the lock member 70. This pressing force AF is inclined relative to the pull-in area 72. By the way, in the paper feed device 50, the direction of movement of the paper feed cassette 51 is regulated to the in-out direction S by the guide rail 52*a*, so the lever shaft 62 also moves only in the in-out direction S. Then, decomposing the pressing force AF and extracting only the force acting in the in-out direction S can show as a divided force BF acting in the pull-out direction S2, as shown in FIG. 7. This divided force BF corresponds to the force with which the lever claw 61*a* presses the pull-in area 72 in the in-out direction S; however, the pull-in area 72 itself, since being fixed to the device body 52 (guide rail 52*a*), does not move. Due to this, as a force repelling the divided force BF, a pull-in force HF in the insertion direction S1 is applied to the lock lever 61, and the pull-in force HF so acts as to move the lock lever 61 in the insertion direction S1. In the present embodiment, the pull-in force HF is set to be about 4 N. Further, the pull-in force HF here shows a calculated value ignoring any reduction attributable to friction and the like.

In the paper feed device 50, the weight of the paper feed cassette 51 itself is about 1 kg, and the weight of the sheets of paper themself is about 5 kg when the paper feed cassette 51 is fully loaded with the sheets of paper. When the paper feed cassette 51 in this state is to be inserted, a force of about 11 N is required, as a result of reduction by the guide rail 52*a*, etc. According to the present embodiment, the pull-in force HF acting on the lock lever 61 can assist the force required to insert the paper feed cassette 51. In this way, a simple mechanism can assist the force to pull in the paper feed cassette 51, making it possible to securely engage the lock lever 61 with the lock member 70. That is, when the lever claw 61*a* is in contact with the pull-in area 72, the rotational force from the spring 63 generates the divided force BF by the inclination of the pull-in area 72, acting as the force to pull the paper feed cassette 51 toward the device body 52 side.

By the way, according to the present embodiment, inserting the paper feed cassette 51 requires the force of about 11 N, while the pull-in force HF is about 4 N which is smaller than about 11 N; however, the pull-in area 72 or the like is merely an auxiliary mechanism, and this mechanism alone is not so made as to complete the pulling-in of the paper feed cassette 51. This is also the case in a first modification and a second modification described below. To complete the pulling-in of the paper feed cassette 51, a separate pull-in unit (not shown) is required; but since the separate pull-in unit is assisted by the auxiliary mechanism described above, the load borne by the pull-in unit can be reduced.

Further, in the case of a third modification described below, the pull-in force is set to about 12.5 N, which is beyond 11 N, thus eliminating the need for any separate pull-in unit.

FIG. 8 is a schematic side view showing the positional relation between the lock lever and the lock member (No. 3).

FIG. 8 shows the state in which the lock lever 61 has been further moved in the insertion direction S1 from the state shown in FIG. 7. As shown in FIG. 8, when the tip end of the lever claw 61*a* passes over the pull-in area 72, due to not being blocked by the pull-in area 72, the lever claw 61*a* rotates downward and the lever claw 61*a* is engaged with the engagement area 71.

As described above, for pulling the paper feed cassette 51 out of the device body 52, the user, when pulling the handle 53, rotates the lock lever 61 in the opposite direction of the engagement direction K by the force transmitted from the transmission mechanism 60. In this way, the force of pulling the paper feed cassette 51 can be so used as to disengage the lock lever 61 from the lock member 70.

Next, the first to third modifications, in which the shape of the lock member 70 is differentiated, are described with reference to FIGS. 9 to 11.

Figure 9:
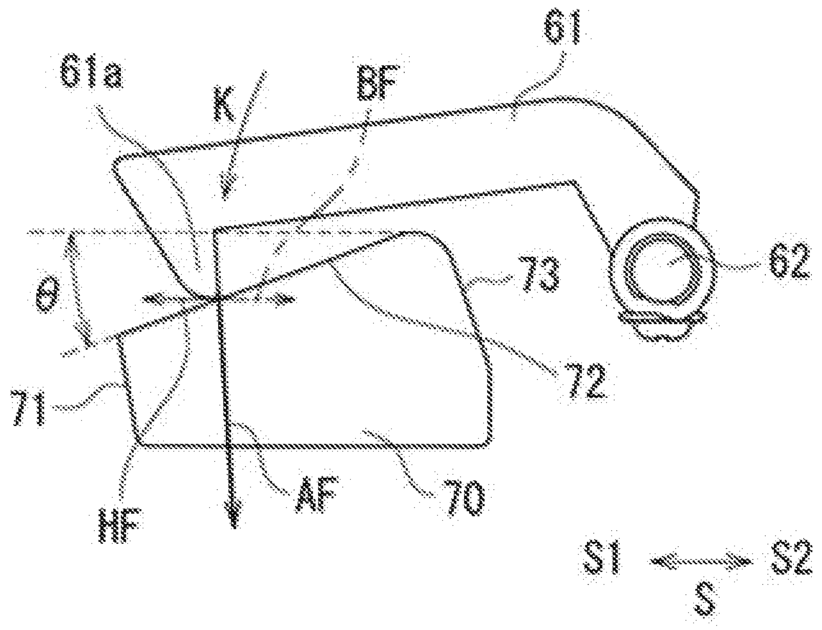
FIG. 9 is a schematic side view showing the positional relation between the lock lever and the lock member in a first modification.

FIG. 9 is a schematic side view showing the positional relation between the lock lever and the lock member in the first modification.

In the first to third modifications, the inclination angle θ and the stroke length SL of the lock member 70 are different from those of the configuration shown in FIG. 6. Specifically, the inclination angle θ in the first modification is set to about 20 degrees, and the stroke length SL is set to 40 mm. Changing the inclination angle θ has enlarged the divided force BF, making the pull-in force HF about 6.0 N.

Figure 10:
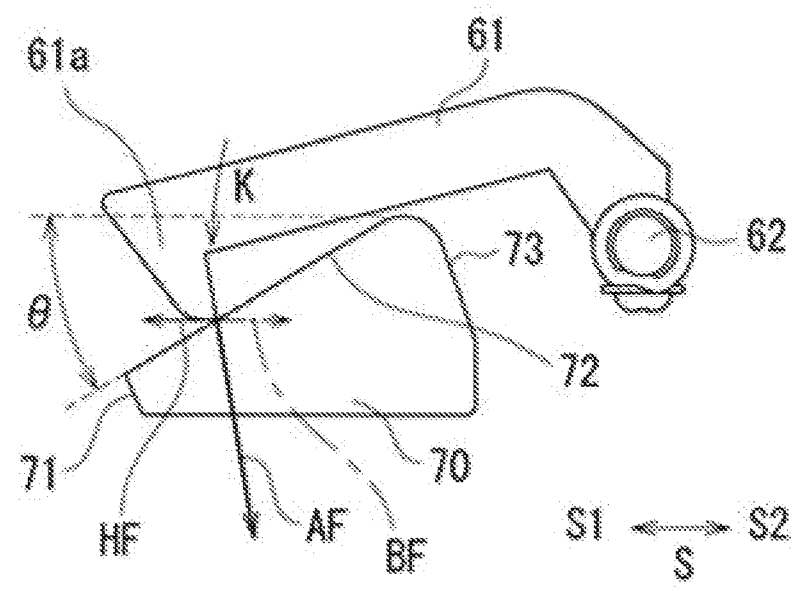
FIG. 10 is a schematic side view showing the positional relation between the lock lever and the lock member in a second modification.

FIG. 10 is a schematic side view showing the positional relation between the lock lever and the lock member in the second modification.

The inclination angle θ in the second modification is set to about 30 degrees, and the stroke length SL is set to 25 mm. Changing the inclination angle θ has enlarged the divided force BF, making the pull-in force HF about 8.8 N.

Figure 11:
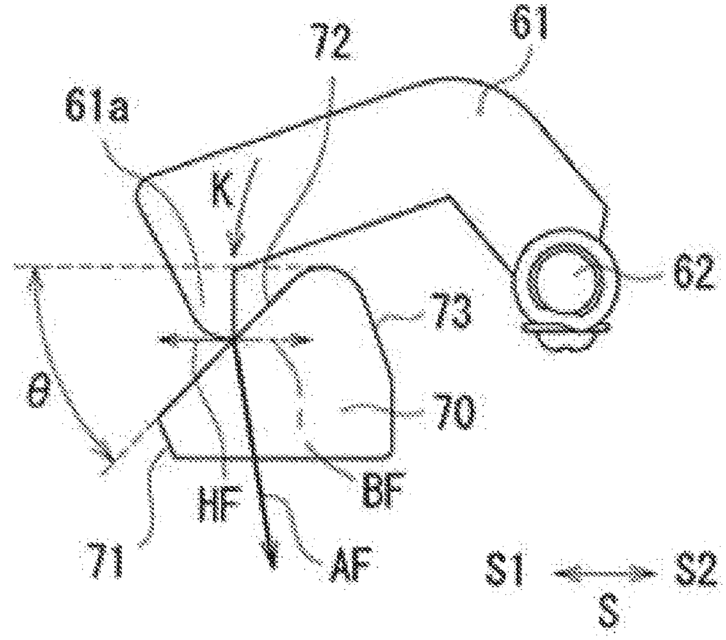
FIG. 11 is a schematic side view showing the positional relation between the lock lever and the lock member in a third modification.

FIG. 11 is a schematic side view showing the positional relation between the lock lever and the lock member in the third modification.

The inclination angle θ in the third modification is set to about 45 degrees, and the stroke length SL is set to 14 mm. Changing the inclination angle θ has enlarged the divided force BF, making the pull-in force HF about 12.5 N.

Enlarging the inclination angle θ as in the first to third modifications enlarges the pull-in force HF, making it possible to move the paper feed cassette 51 despite the stroke length SL being short; therefore, with the stroke length SL shortened, the lock member 70 can be shortened.

Second Embodiment

Next, the image forming apparatus according to the second embodiment of the present invention will be described with reference to the drawings.

According to the second embodiment, the configuration in the vicinity of the lock member 70 is different from that of the first embodiment. Since the second embodiment has substantially the same configuration as that of the first embodiment shown in FIGS. 1 and 8, the description thereof is to be omitted and only the differences are to be described.

Figure 12:
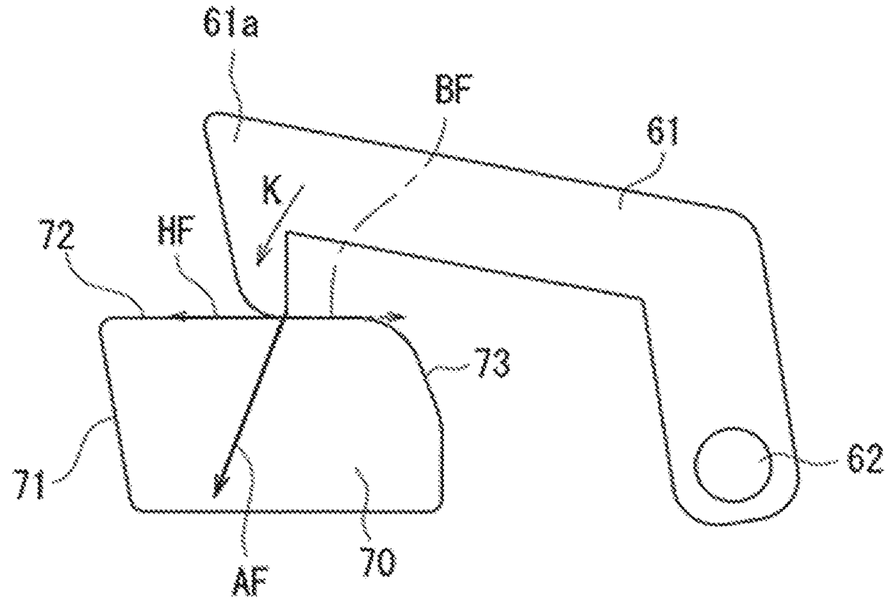
FIG. 12 is a schematic side view showing the positional relation between the lock lever and the lock member in the second embodiment of the present invention (part 1).
Figure 13:
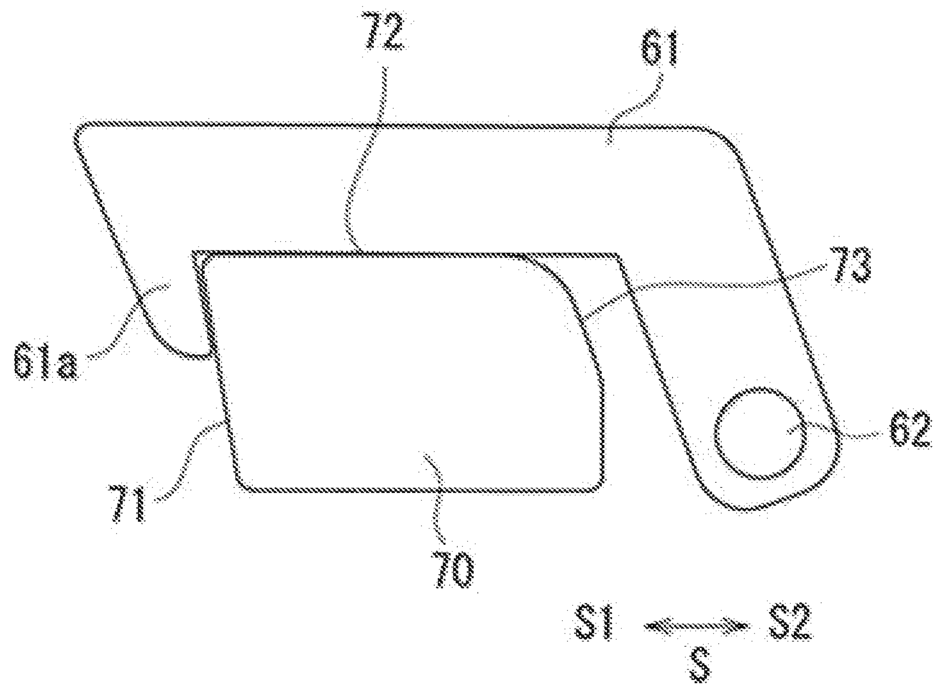
FIG. 13 is a schematic side view showing the positional relation between the lock lever and the lock member in the second embodiment of the present invention (part 2).

FIG. 12 is a schematic side view showing the positional relation between the lock lever and the lock member in the second embodiment of the present invention (part 1), and FIG. 13 is a schematic side view showing the positional relation between the lock lever and the lock member in the second embodiment of the present invention (part 2).

FIG. 12 shows a state in which the tip end of the lever claw 61*a* is in contact with the pull-in area 72 of the lock member 70, and FIG. 13 shows a state in which the lever claw 61*a* is engaged with the engagement area 71 of the lock member 70.

The second embodiment differs from the first embodiment in the configuration of the pull-in area 72 in the lock member 70. Specifically, the pull-in area 72 is a face parallel to the insertion direction S1. Further, the lever shaft 62 is provided lower in position than the pull-in area 72. As a result, the lever claws 61*a* is so made as to strike the pull-in area 72 from diagonally above, and the pressing force AF's angle relative to the pull-in area 72 is not a right angle. Due to this, even in this configuration, the pull-in area 72, as toward the engagement area 71, is so inclined as to descend downward in the engagement direction K. Then, the divided force BF acting in the pull-out direction S2 applies, to the lock lever 61, the pull-in force HF in the insertion direction S1, thereby to move the lock lever 61 in the insertion direction S1.

The embodiments disclosed this time are exemplary in all respects and are not intended to be the basis for a limited interpretation. Accordingly, the technical scope of the present invention is not interpreted solely by the above embodiments, but is defined based on recitations of the claims. Further, the technical scope of the present invention includes all modifications within the meaning and scope of the claims and equivalents.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A paper feed device including a device body and a paper feed cassette inserted into the device body along an insertion direction, the paper feed device comprising:
- a lock lever mounted to the paper feed cassette via a lever shaft;
- a spring that applies a rotational force which rotates the lock lever in an engagement direction; and
- a lock member provided at the device body,
- wherein
- the lock lever has a lever claw provided at a tip end extending from the lever shaft toward a downstream side in the insertion direction,
- the lock member has an engagement area with which the lever claw is engaged, a pull-in area provided at an upstream side of the engagement area in the insertion direction, and a push-up area provided at an upstream side of the pull-in area in the insertion direction,
- the pull-in area, toward the engagement area, is inclined so as to descend downstream in the insertion direction,
- when the paper feed cassette is to be inserted into the device body, the lever claw presses the pull-in area, and
- the push-up area, toward the pull-in area, is inclined so as to rise.

2. The paper feed device according to claim 1, further comprising:
- a handle provided at the paper feed cassette so as to swing back and forth slightly, the handle having a grip portion that is gripped by a user when pulling out the paper feed cassette and an extended portion extended from the grip portion; and
- a transmission mechanism that transmits, to the lever shaft, a force of pulling out the paper feed cassette by the user gripping the handle, the transmission mechanism including the extended portion and a connection portion on the lever shaft to which the extended portion is hooked, and rotating the lever shaft when the user pulls and swing the handle,
- wherein
- the lock lever is rotated, in a direction opposite the engagement direction, by the force transmitted from the transmission mechanism.

3. An image forming apparatus comprising the paper feed device according to claim 1.

* * * * *